US009054828B2

(12) United States Patent
He

(10) Patent No.: US 9,054,828 B2
(45) Date of Patent: Jun. 9, 2015

(54) METHOD AND SYSTEM FOR MANAGING OPTICAL DISTRIBUTION NETWORK

(75) Inventor: Xiongwei He, San Jose, CA (US)

(73) Assignee: Glimmerglass Networks, Inc., Hayward, CA (US)

( * ) Notice: Subject to any disclaimer, the term of this patent is extended or adjusted under 35 U.S.C. 154(b) by 174 days.

(21) Appl. No.: 13/459,062

(22) Filed: Apr. 27, 2012

(65) Prior Publication Data

US 2013/0094855 A1 Apr. 18, 2013

Related U.S. Application Data

(60) Provisional application No. 61/547,511, filed on Oct. 14, 2011.

(51) Int. Cl.
H04J 14/00 (2006.01)
H04J 14/02 (2006.01)
H04Q 11/00 (2006.01)

(52) U.S. Cl.
CPC ........ H04J 14/0227 (2013.01); H04Q 11/0062 (2013.01); H04Q 2011/0073 (2013.01); H04Q 2011/0086 (2013.01); H04J 14/0267 (2013.01); H04J 14/0269 (2013.01)

(58) Field of Classification Search
CPC ............... H04J 14/0267; H04J 14/269; H04Q 2011/0073
USPC ....................................... 398/58, 54
See application file for complete search history.

(56) References Cited

U.S. PATENT DOCUMENTS

| | | | |
|---|---|---|---|
| 6,600,581 B1 | 7/2003 | Fatehi et al. | |
| 6,763,192 B1* | 7/2004 | Jagannathan | 398/54 |
| 7,020,394 B2* | 3/2006 | Zhang et al. | 398/25 |
| 7,477,843 B1* | 1/2009 | Peeters et al. | 398/57 |
| 7,526,203 B2* | 4/2009 | Tamil | 398/54 |
| 8,521,022 B1* | 8/2013 | Sriram et al. | 398/57 |
| 2002/0012489 A1 | 1/2002 | Solgaard et al. | |
| 2002/0080435 A1* | 6/2002 | Lu et al. | 359/109 |
| 2002/0126342 A1 | 9/2002 | Wetzel et al. | |
| 2002/0168129 A1* | 11/2002 | Gruber et al. | 385/16 |
| 2002/0186432 A1* | 12/2002 | Roorda et al. | 359/128 |
| 2002/0191241 A1* | 12/2002 | Emery et al. | 359/109 |
| 2003/0016411 A1* | 1/2003 | Zhou et al. | 359/110 |
| 2003/0147645 A1 | 8/2003 | Imajuku et al. | |
| 2003/0174928 A1 | 9/2003 | Huang et al. | |
| 2004/0208587 A1* | 10/2004 | Chang et al. | 398/100 |
| 2005/0213971 A1 | 9/2005 | Amemiya et al. | |

(Continued)

OTHER PUBLICATIONS

Zhou et al; On a dynamic wavelength assignment Algorithm for wavelength-routed all optical network; 2006.*

(Continued)

*Primary Examiner* — Ken Vanderpuye
*Assistant Examiner* — Amritbir Sandhu
(74) *Attorney, Agent, or Firm* — Kilpatrick Townsend & Stockton LLP; Kenneth R. Allen

(57) ABSTRACT

A method for generating optical paths in a photonic network is provided. A model of a photonic network is used to store relationship information that describes the relationships between photonic network elements, as well as configuration information about the elements of the photonic network. A path manager receives a request to generate one or more paths based on an input port and one or more output ports. Using the information stored in the photonic network model, the path manager generates one or more candidate paths.

42 Claims, 5 Drawing Sheets

(56) References Cited

U.S. PATENT DOCUMENTS

| | | | |
|---|---|---|---|
| 2006/0177219 A1* | 8/2006 | Tsuritani et al. | 398/5 |
| 2007/0274724 A1* | 11/2007 | Gumaste | 398/83 |
| 2008/0260383 A1* | 10/2008 | Zhong et al. | 398/50 |
| 2009/0116836 A1* | 5/2009 | Bernstein et al. | 398/51 |
| 2009/0232492 A1* | 9/2009 | Blair et al. | 398/5 |
| 2010/0202773 A1* | 8/2010 | Lee et al. | 398/48 |
| 2010/0220996 A1* | 9/2010 | Lee et al. | 398/25 |
| 2010/0247096 A1* | 9/2010 | Emery et al. | 398/30 |
| 2010/0284691 A1* | 11/2010 | Zottmann | 398/49 |
| 2011/0188865 A1* | 8/2011 | Lalonde et al. | 398/156 |
| 2011/0222846 A1* | 9/2011 | Boertjes et al. | 398/1 |
| 2011/0243558 A1 | 10/2011 | Iizawa et al. | |
| 2012/0201539 A1* | 8/2012 | Boertjes et al. | 398/51 |
| 2012/0237217 A1* | 9/2012 | Spivey et al. | 398/48 |
| 2012/0321297 A1* | 12/2012 | Bottari et al. | 398/26 |
| 2013/0202299 A1* | 8/2013 | Prakash et al. | 398/51 |
| 2013/0209093 A1* | 8/2013 | Tanimura et al. | 398/32 |
| 2013/0216223 A1* | 8/2013 | Xie | 398/48 |
| 2013/0315580 A1* | 11/2013 | Boertjes et al. | 398/5 |
| 2014/0099118 A1* | 4/2014 | Zhang et al. | 398/79 |

OTHER PUBLICATIONS

Charbonneau et al; Routing and wavelngth assignment of static manycasr demands over all-optical wavelength routed WDM networks; Jul. 2010; optical society of America; p. s442-455.*

Ma et al; on path selection for traffic with bandwidth guarantees; 1997; IEEE; pp. 191-202.*

International Search Report and Written Opinion of the International Searching Authority for PCT Application No. PCT/US2012/058497, mailed on Jan. 22, 2013, 10 pages.

* cited by examiner

METHOD AND SYSTEM FOR MANAGING OPTICAL DISTRIBUTION NETWORK

CROSS-REFERENCES TO RELATED APPLICATIONS

The present application is a non-provisional of and claims the benefit and priority under 35 U.S.C. 119(e) of U.S. Provisional Application No. 61/547,511, filed Oct. 14, 2011, entitled METHOD AND SYSTEM FOR MANAGING OPTICAL DISTRIBUTION NETWORK, the entire contents of which IS incorporated herein by reference for all purposes.

BACKGROUND OF THE INVENTION

In today's networked world, almost all network traffic travels on an optical fiber based network at one point or another. The volume of traffic continues to rise at a very rapid pace due to the fact that more devices are interconnected with one another and more applications deployed. Not only is the massive amount of traffic constantly created but also is its flow frequently changing as to the paths across an optical network. It presents a tremendous challenge to analysts who monitor the network for cyber security, and their abilities to take actions quickly to imminent threats. These threats are increasingly complex. They require a variety of processing and analytical tools to probe into the signals in parallel in real time. Current trends in bandwidth growth, protocol evolution, and multiple signal formats including DWDM make it more difficult to track and respond to events without significant increases in CAPEX and OPEX. There is a need for a flexible network platform to monitor and selectively intercept communications from geographically diverse areas, distribute the collected optical signals to one or multiple destinations, and centrally manage the process on demand from remote locations.

At the edge of this monitoring network, intelligent optical devices such as sensors, signal probes, data storage and other client devices are usually connected. Optical signals are selected and collected by devices at the ingress, and they are processed, analyzed, monitored and stored by client devices at the egress of the network. The optical signals collected by an ingress device have to be delivered faithfully to their final destination(s) or client(s) in their original analog forms without distortion. This requirement eliminates the use of Optical-Electronic-Optical (O-E-O) regeneration techniques employed by conventional digital communication fiber networks. The solution must leverage purely optical, photonic signal management techniques to create a 'transparent' path between end points of a network. This means that the network platform is independent of optical wavelengths, data formats or data rates. For example, it is capable of managing optical RF analog signals as well as digital signals such as 10G or 100G without the need for hardware or even software upgrades.

The basic components utilized by this all-optical distribution network include Optical Splitter, Optical Amplifier, and Wavelength Division Multiplexer (WDM), transparent Optical Cross-connect (OXC) or photonic switch and optical fibers interconnecting these components together with edge devices. An optical splitter is a passive device (no electrical power required) that splits the optical power carried by a single input fiber into multiple output fibers at a specified power ratio. An optical amplifier is a device that amplifies an optical signal directly, without the need to first convert it to an electrical signal. A Wavelength Division Multiplexer is also a passive device that separates or combines optical wavelengths. A transparent cross-connect is a device used to reconfigure optical signal paths in the network, which accepts optical signal without regard for its data rate or protocol. The reconfigurable fiber network constituted by these optical components, together with all intelligent end-devices connected at the edge of the network for signal collection, monitoring and analysis, provides an effective integrated and scalable network platform. It allows resource sharing, the flexibility and scalability to manage signal collection, distribution, remote monitoring as well as data storage for future growth in terms of optical capacity. In addition, this all-optical distribution network solution will dramatically reduce power consumption compared to electronic solution.

Photonic switch is the primary element to be managed that configures optical paths. Optical MEMS (Micro-Electro-Mechanical System) switch as an example of photonic switch, two of its micro-mirrors are physically manipulated and placed at angles that direct the optical signal beam, creating an optical cross-connect within the switch that ensures that the signal exits the switch via the desired port. Photonic switch-based Optical Signal Distribution Networks (OSDN), unlike electrical signal-based network devices, do not read or process the signal being distributed in order to determine a path for that signal in the same way electrical-based switches do. The control of photonic switch in a network is accomplished by either out-of-band or in-band method. Out-of-band method requires the management interface on an intelligent optical switch to be accessed via a separate network or connection from which the control instructions are received and processed by the switch to direct a received signal to an outgoing port. In-band method is that the control instructions are embedded in optical data channel and have to be separated from optical data when received by the switch prior to being processed.

The increased amount of network traffic traveling on optical networks and the ever changing traffic pattern flows have caused entities that analyze such traffic to build ad-hoc optical networks that are made up of many intelligent optical switches. These switches are interconnected with one another, and have various optical input signals. This type of ad hoc optical network is characterized by its temporary connections between edge devices. When a network operator wishes to perform data analysis on a particular input signal, that input signal is directed to a network edge device that has an output port connected to a data analysis system or probe that is capable of reading and analyzing the signal.

However, as these ad-hoc networks continue to grow, manually creating and configuring paths through these networks is becoming extremely difficult and time consuming. Furthermore, existing network management systems do not support path generation for photonic switches, as they rely on specific attributes of electric switches. Thus, there is an emerging need to build a flexible, expandable and transparent optical signal distribution network to connect an increasing number of optical signals to an ever expanding signal processing plant. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Photonic networks operate, in part, by directing the path of a signal that is carried over a photonic medium by using mirrors or other physical mechanisms to redirect the optical signal. In a large ad-hoc photonic network, it is difficult to determine a decent path through the network for a given signal, even when the network operator knows which port the input signal is using to enter the network and which ports represent the desired output ports.

In an embodiment, a network model for a photonic network is maintained. The network model can be stored in a database, text file or flat file, memory, or any other computer-readable storage medium. The model includes any or all information relating to the photonic network architecture, including the location of signal amplifiers, whether or not a resource (such as a port on a switch) is being used, and the location of splitters. The model also includes relationship information that describes the relationships between photonic network elements, such as cross-connect switches, optical links, amplifiers, splitters, ports, WDM, input signal sources, and output information which can describe the characteristics of a data analysis system or probe, such as the required signal strength for the device connected to the output port. The order of components within the network may also be described in the network model. Configuration information is also stored in the network model. Configuration information describes the current state of each network element in an embodiment. Historical, and "test" configuration information can also be stored in the network model.

In an embodiment, a path manager is used to generate paths based on a desired input port and one or more output ports. For example, the path manager may receive a request for path generation from a network operator that needs to analyze a signal that is coming from a known input port at one or more known output ports. In an embodiment, the path manager uses the relationship information that is stored in the network model to generate one or more paths that could be used to satisfy the request. The path manager may select a path from the candidate paths, or may present the candidate paths to the network operator via a user interface, so that the network operator can select a path from the list of candidate paths. In an embodiment, the selected path is then automatically configured by issuing instructions to the elements of the path, such as photonic switches, using a management interface.

The Path Manager Environment

Figure 1:
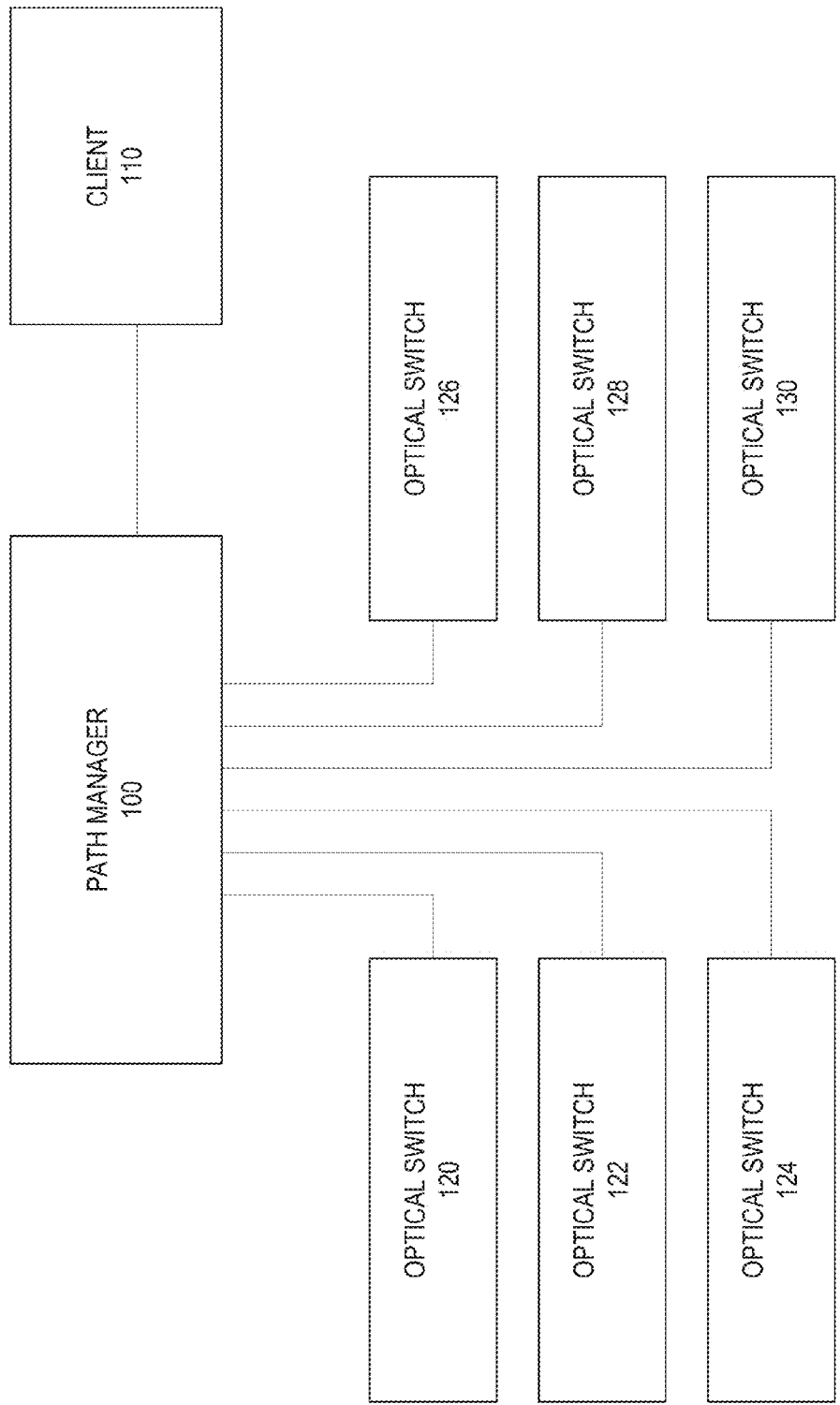
FIG. 1 is a block diagram that illustrates an environment in which an embodiment may be implemented.

FIG. 1 illustrates a block diagram of a logical environment in which a path manager for a photonic network may be implemented, according to an embodiment. Referring to FIG. 1, the environment generally includes a path manager 100, a client 110, optical switches 120-130.

In the embodiment illustrated in FIG. 1, path manager 100 is communicatively coupled to client 110 and optical switches 120-130. Path manager 100 is connected to the optical switches 120-130 via a network connection, such as a local network connection or the Internet. Client 110 is also connected to path manager 100 via a network connection.

In an embodiment the network connection used to connect path manager 100 to optical switches 120-130 is not communicatively coupled to the network controlled by optical switches 120-130. For example, optical switches 120-130 may be interconnected to one another to form an optical network such as the one illustrated in FIG. 4. However, path manager 100 is unable to issue configuration commands over the optical network, even though path manager 100 is connected to optical switches 120-130 via a different network.

The connection between path manager 100 and optical switches 120-130 is used to allow path manager 100 to perform configuration operations on optical switches 120-130 in an embodiment. For example, path manager 100 may issue configuration instructions to optical switches 120-130 using a network management protocol such as SNMP.

In an embodiment, client 110 communicates with path manager 100 using a web browser. In another embodiment, client 110 includes software configured with instructions for controlling the resources of path manager 100. In another embodiment, path manager includes client 110.

Intelligent Optical Switch

Figure 2:
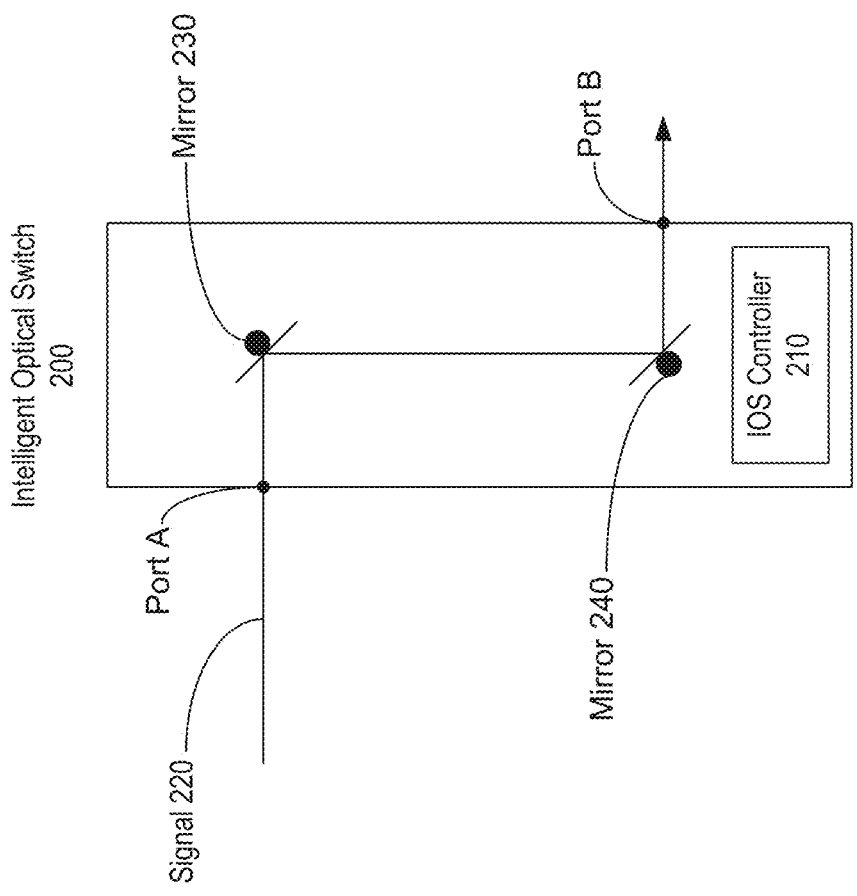
FIG. 2 is a block diagram that illustrates an optical switch in an embodiment.

FIG. 2 illustrates a block diagram for an example intelligent optical switch. An intelligent optical switch 200 is a switch that can be configured to selectively switch optical signals such as infra-red signals from one circuit to another. Intelligent optical switches include a category of switches that are called "photonic switches," named for their ability to switch optical signals without first converting to electronic signal. Photonic switches often are based on that mechanism that physically manipulate the mirror tilt or the refractive index of optical material to alter the direction of optical beam.

Referring to FIG. 2, signal 220 enters intelligent optical switch 200 at port 220. Signal 220 is redirected by mirror 230, and redirected again by mirror 240. Signal 220 then exits intelligent optical switch 200 via port 240. This internal path between port A and port B is called an optical cross-connect. By physically manipulating mirrors 230 and 240, as well as other mirrors in intelligent optical switch 200 (not shown), intelligent optical switch 200 can be configured to redirect signal 220 using a differently configured optical cross connect within the intelligent optical switch 200, and out via a different port.

Intelligent optical switch (IOS) controller 210 includes logic for receiving requests to change the optical cross-connects within intelligent optical switch 200. This logic is associated with the mechanical features of intelligent optical switch 200, and therefore able to cause the physical manipulation required to redirect an optical signal within intelligent optical switch 200. IOS controller 210 includes a network interface or other interface capable of receiving instructions and a processor for executing the instructions, which cause the physical manipulation of signal 220.

In an embodiment, any number of intelligent optical switches such as intelligent optical switch 200 can be interconnected with one another. Each intelligent optical switch may have over one hundred ports, and more than one port may be used to connect two switches to one another. An optical switch may also be connected to itself, and may use a splitter for such a connection.

In addition to intelligent optical switches, a photonic switch-based optical signal distribution network is designed to transparently distribute an optical signal from one side of the network to one or many points on the other side of the same network. An optical signal distribution network is composed of photonic switches, optical splitters, optical amplifiers, fibers and other active or passive components performing signal. These components can be used to build an optical signal distribution network in various combinations depending on geographic locations of signal source, processing equipment and other factors. This results in an ad-hoc network topology.

The Path Manager

Figure 3:
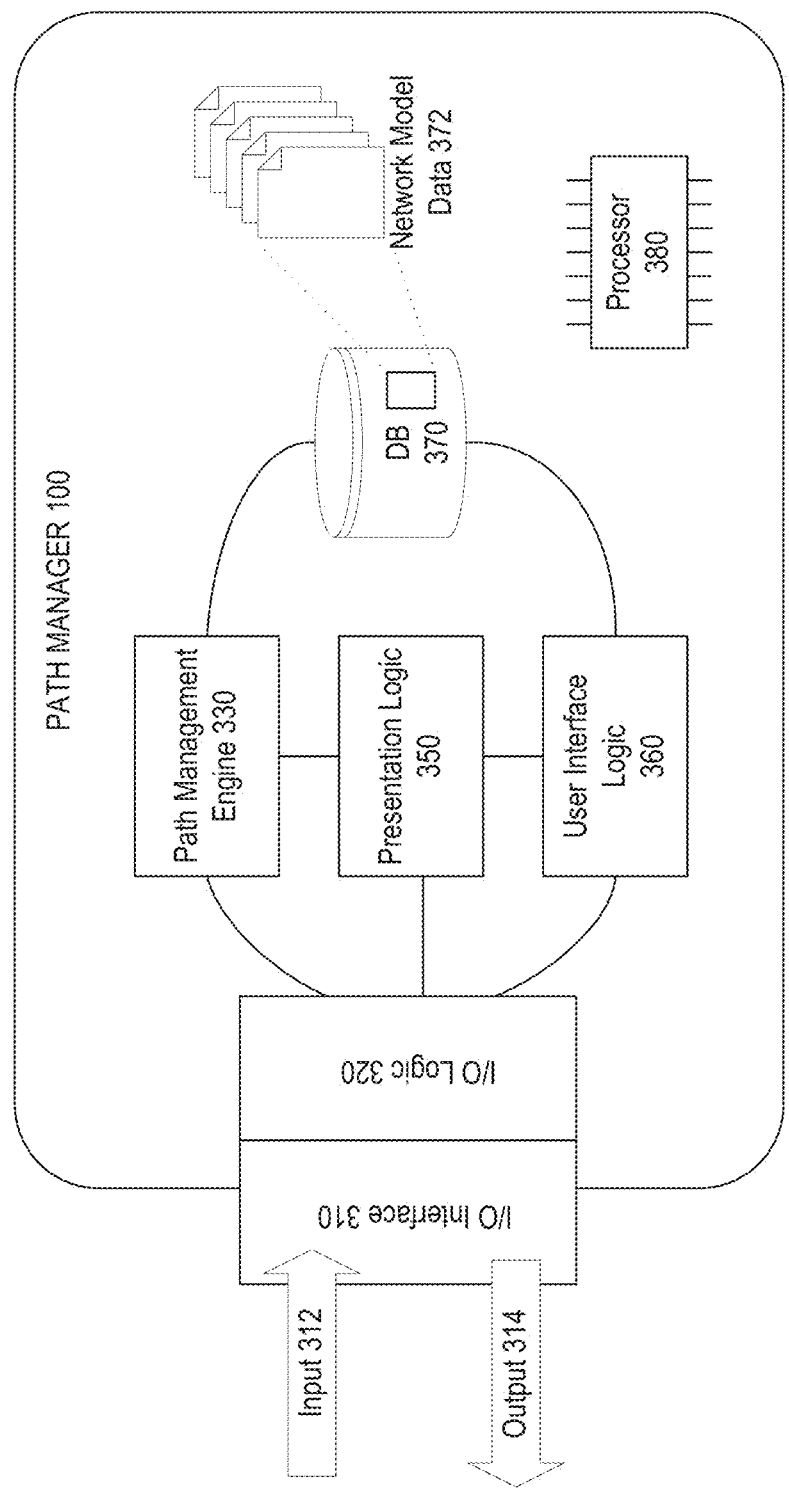
FIG. 3 is a block diagram that illustrates a path manager in an embodiment.

FIG. 3 is a block diagram that illustrates path manager 100 of FIG. 1 in greater detail, according to an embodiment. Referring to FIG. 3, an input 312 is received by the path manager 100 at an input/output (IO) interface 310. IO interface 310 may be a network interface such as an Ethernet-based interface or a wireless networking interface.

Input 312 may include requests directed to a web server associated with user interface logic 360, which generates a response with presentation logic 350. The request may be for a web-based interface that a user of client 110, such as a network engineer, may use to request a path selection or a path recommendation for a given set of input/output ports. In another embodiment, input 312 comprises a direct request for a path selection or recommendation.

Output 314 may include instructions for IOS switches, such as IOS switches 120-130. These instructions may be the result of an automatic path selection decision made by path management engine 330. The instructions may include instructions for each IOS switch that is required to make a configuration change in order to complete the creation of the desired path. In another embodiment, output 314 includes dynamically generated output that informs the user about one or more IOS switches or other optical networking devices. In an embodiment, the output is in the form of a web page that is generated by a web server associated with user interface logic 350. The information may include information about the current paths, network status information, statistics, or path recommendations. For example, a path recommendation containing one or more paths for the user to choose from may be sent as output 314 in response to input 312 from a user that requests a path selection or recommendation.

An IO logic 320 is coupled to IO interface 310. IO logic is configured to parse and distribute incoming data and prepare output 314 for sending via IO interface 310, according to an embodiment. IO logic 320 may implement one or more communications protocols. IO logic 320 is coupled to path management engine 330, presentation logic 350, and user interface logic 360, in an embodiment. IO logic 320 is also coupled to a database 370, in an embodiment.

Path management engine 330, presentation logic 350, and user interface logic 360 are all coupled to database 370, in an embodiment. Database 370 may include network model data 372. Network model data 372 represents a database table or other storage that stores relationships between elements of the network, as well as current, past, and default network configuration data. For example, data defining all of the paths set up in the network, available ports, available amplifiers and splitters, and other network information describing the current state of the network may be stores in database 370. Other relationship information may include the order of components for a particular portion of the network in an embodiment.

Database 370 may also include other data such as user authentication data (not shown) in an embodiment. For example, a user may request, via client 110, access to a user interface via user interface logic 360 in path manager 100 in an embodiment. User interface logic 360 receives as input 312 a username and password combination or other authentication information. User interface logic 360 makes a request to database 370 to authenticate the user by matching the username and password combination to one stored in database 370. Upon successful authentication, user interface logic 360 generates a user interface to be presented to the user by presentation logic 350.

Path management engine 330, presentation logic 350, user interface logic 360 and database 370 are all coupled to a processor 380, which executes instructions provided by these elements of path manager 100.

Example Network

Figure 4:
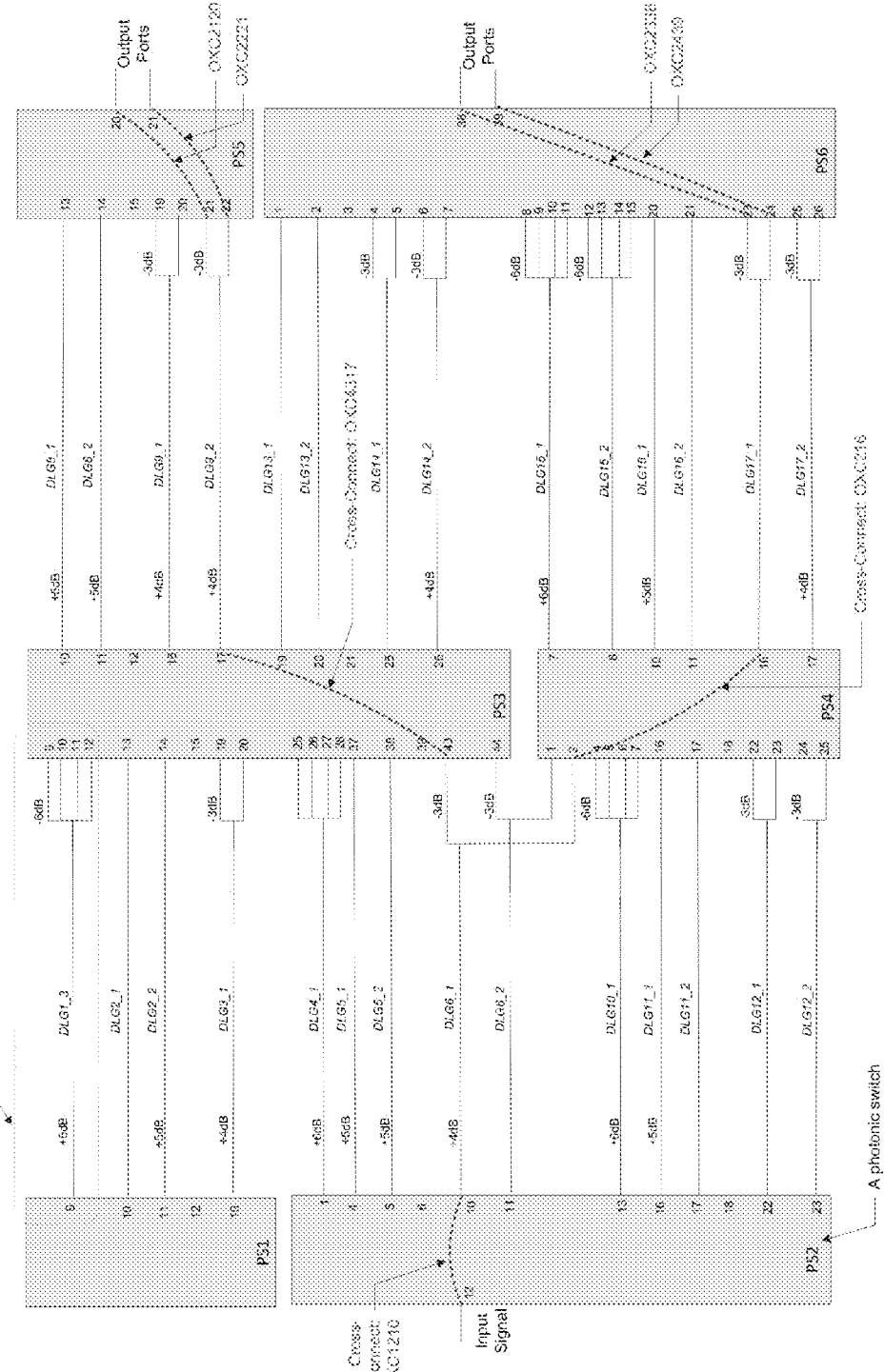
FIG. 4 is a block diagram that illustrates an example ad-hoc photonic network that may be managed by a path manager in an embodiment.

Referring to FIG. 4, the rectangular boxes represent photonic switches supporting cross connect functions. They provide the capability to dynamically switch any input signal to any output port on the same switch. The photonic switches are the key components that provide the ability to build a dynamic signal route or path over an otherwise statically connected network.

Fibers are used to connect photonic switches together. Amplifiers are used to make sure the optical signal can traverse through the whole or part of the network without losing information. Splitters are used to multicast the signal at optical level.

These elements together form a flexible, transparent and extensible fabric to support simultaneous distribution and multicasting of many optical signals. In the network diagram of FIG. 4, for better readability, many fiber links with same characteristics are drawn. For example, DLG1_3 is a link with a 1:4 splitter and an amplifier with 6 dB gain.

Network Modeling

It is useful to generate a network model in order to determine potential paths through the network for any given input/output requirement. The following concepts and definitions are meant to provide context to a model so that it can be more easily explained:

Photonic Switch: a system designed to switch optical signal at photonic level without any conversion and analysis of the signal itself. Input signal is redirected to a given output port using sophisticated devices and techniques such as micro-mirrors controlled by MEMS (microelectromechanical systems).

Optical Link: a physical connection between 2 or more photonic switches. An optical link can be as simple as a straight-through fiber connection between 2 photonic switches. It can be as complex as one that connects one to many switches with amplifiers to boost the signal and splitters to passively multicast it. In the embodiment illustrated by FIG. 4, for example, DLG13_1 shows a straight-through optical link whereas DLG6_1 is an optical link that has an amplifier with 4 dB gain and a 1:2 splitter distributing the signal to photonic switches PS3 and PS4.

Optical Cross-Connect: a logic configuration applied to a pair of input and output ports in a photonic switch for the purpose of switching the signal coming into the switch from the designated input port to the designated output port.

Optical Path: a specific combination of optical cross-connects and optical links established for the purpose of providing a path to bring an optical signal from the designated input port to a set of output ports. The simplest form of an optical path is an optical cross-connect bringing an optical signal from an input port of a photonic switch to an output port of the same switch. A complex optical path can be composed of many cross-connects in several different photonic switches interconnected by a number of optical links.

Photonic Route: a combination of photonic switches interconnected together with potential capacity to support an optical path for distributing an optical signal to the output ports required.

Referring to FIG. 4, the concepts of photonic switch, optical cross-connect, optical link are illustrated. Lines illustrate an optical path from input port 12 of photonic switch PS2 to output ports 20, 21 of PS5 and output ports 38, 39 of PS6. This optical path traverses the following optical links:

DLG6_1: from output port 10 on PS2 to input port 43 on PS3 and input port 2 on PS4
DLG9_2: from output port 17 on PS3 to input ports 21, 22 on PS5
DLG17_1: from output port 17 on PS4 to input ports 23, 24 on PS6

This optical path also traverses following optical cross-connects dynamically created to support the input signal to the designated output ports:

OXC1210: input port 12 to output 10 on PS2
OXC4317: input port 43 to output port 17 on PS3
OXC216: input port 2 to output port 16 on PS4
OXC2120: input port 21 to output port 20 on PS5
OXC2221: input port 22 to output port 21 on PS5
OXC2338: input port 23 to output port 38 on PS6
OXC2439: input port 24 to output port 39 on PS6

The photonic route supporting this optical path is: PS2, PS3, PS4, PS5 and PS6. There's no alternative route.

Network Topology

In order to determine potential paths for a signal through a photonic network, the topology of the network being used should be known. The network topology can be acquired in 2 different ways: a) Manually: the network operator manually input the network topology using a graphic tool or a text file with a well-defined format; or B) Automatically: a dedicated tool to discover automatically the topology with minimum information provided by the network operator.

Once the network topology is acquired, an object representation can be created an stored in the network model data 372 database table. The topology information is based on relationships between objects represented in the model. These objects may be stored in XML format, in a relational database, or in any other format that can keep track of relationships between objects.

Several types of relationships are established to create a logical representation of the network in an embodiment: A) A photonic switch and its ports: this is a straight-forward containment relationship; B) Upstream photonic switches: the photonic switches located at upstream side of the photonic switch in question; C) Downstream photonics switches: the photonic switches located at downstream side of the photonic switch in question; D) Incoming optical links: optical links connected to a photonic switch from input side; E) Outgoing optical links: optical links connected to a photonic switch from output side; and F) Loopback optical links: optical links connecting to the output side of a photonic switch hack to the input side of the same switch. These relationships form a basis for subsequent route and path finding. Other relationships may be stored, such as the order of network elements in the network.

In an embodiment, the network model data 372 is dynamic, and not static. Path manager 100 includes network monitoring logic that is configured to connect to optical switches such as IOS 200, and learn information about the network from IOS controller 210, as IOS controller 210 monitors the state of the switch. For example, the bit-error rate, optical signal-to-noise ratio, the power levels, latency, gain, and other attributes associated with the switch 200 can be learned from IOS controller 210. Other mechanisms for learning the state of network elements may also be used by path manager 100. Once a discrepancy between the information stored in network model data 372 is detected, the network monitoring logic can update the data in database 370. The new data may then be used for generating paths.

Optical Paths

A path, in the context of optical networking, is the way a signal travels through time network from the input to one or more outputs. A path contains an input port, an array of output ports and an array of path elements in an embodiment. A path element is a component used to represent a tree structure path into a linear array of elements. A path element is defined by an "anchor" photonic switch and all its outgoing optical links used to support the path. A "shared optical link" is an optical link connecting one photonic switch to more than one photonic switches through the use of splitters.

It is important to note that optical network paths naturally include branches in some cases, because the signal may be split. For example, FIG. 4 shows a path that starts at the input signal at photonic switch 2 (PS2), port 12. The signal travels through cross-connect OXC1210 and exits PS2 via port 10. The signal continues over optical link DLG6_1 after passing through a +4 dB signal amplifier. Optical link DLG6_1 has a splitter, which causes the signal to enter both port 43 of PS3 and port 2 of PS4. The portion of the path passing through PS3 includes cross-connect OXC4317, port 17, a +4 dB signal amplifier, and a splitter that causes this branch to split into two signals, which pass through PS5 using port 21 and port 22, respectively. The portion of the signal that entered PS5 via port 21, passes through cross-connect OXC2120 and exits via exit port 20. The portion of the signal that entered PS5 via port 22, passes through cross-connect OXC2221 and exits via exit port 21. The portion of the signal split by the first splitter that enters PS4 will eventually be split into two signals, and exit via output ports 38 and 39 of PS6. The additional path elements for this signal are not discussed, but can be seen in FIG. 4. However, FIG. 4 shows that a single path can start with one input (port 12 of PS2), and end with four outputs (ports 20 and 21 of PS5, and ports 38 and 39 of PS6).

Paths in optical networks sometimes require the use of an optical loopback link in order to meet the requirements of a requested path. For example, a path may only include two switches without a splitter between them. However, an optical loopback may include a splitter, causing the signal at a first input port to be split into a signal that is input into the same switch at two additional input ports. The split signals can each be cross-connected to a desired output port, and directed to the second switch.

With large ad-hoc optical networks, many potential paths from the input signal port to one or more output ports exist. The example network shown in FIG. 4 is much smaller than many optical networks in production today, but easily illustrates the complexity associated with determining a path in an optical network. The complexity is magnified when hundreds of optical switches, each often having more than 100 ports, are connected to one another in ad-hoc fashion. The complexity of path determination is compounded even further when the nature of optical paths (i.e., that they can have more than one output) is considered.

Route Determination

Before the path determination process begins, in an embodiment, the relationships stored in network model data 372 are analyzed in order to determine which routes are possible routes that match the input port and output port information received by path manager 100. Route finding sets the context and scope for subsequent path finding. Route finding consists of finding the succession of interconnected photonic switches that can lead the signal from the input port all the way to all the output ports designated by the user. In other words, a route is defined by the switches that a signal could traverse in order to satisfy the requirements of the requested path.

The first step in route determination is to find the input switch. This is the photonic switch where the input port is located. The input port is provided as part of the path suggestion or path selection request. By matching the input port with a device in the known network topology information in network model data 372, the input switch is determined. Next, all output switches are detected by matching the output ports (provided as part of the initial request) with one or more switches using the network topology information stored in network model data 372. Each output switch is compared with the input switch to see if they are the same switch. If so, then that switch is one possible route.

If the output switch is not also the input switch, then switches that have an upstream relationship to the output switch are examined. For each upstream switch that has not been examined already, that upstream switch is compared with the input switch to see if they are the same switch. If so, then that switch and the downstream switch make up one possible route. Upstream switches are then recursively examined in the same fashion to determine if they match the input switch. When this process has been accomplished for all output switches, a list of routes is stored in memory for use with the path selection process. Once the possible routes have been determined, the routes are used to determine potential paths.

Example Route Determination Pseudo-Code

The following represents an example pseudo-code listing for finding available routes, as discussed above:
Method findRoutes(input port, array of output ports): returns an array of routes
1. Find the input switch ps(a) using the input port and network topology previously acquired
2. Find the array of ps(z) for all outputs and network topology
3. Create an array to hold the routes found
4. For each output switch ps(z):
   4.1 Create an empty route structure to record current route being searched: current_route
   4.2 Check whether this switch is also the input switch
   4.3 If yes,
      4.3.1 add ps(z) to the current_route;
      4.3.2 add current_route to the array of routes found
   4.4 If no,
      4.4.1 add ps(z) into current_route;
      4.4.2 call method findRoutes (ps(a), current_route, array of routes found);
      4.4.3 add the array of routes found in this iteration into the overall array of routes found
5. If the overall array of routes found is not empty:
   5.1 merge the array of routes to create a new array of routes each of which is an unique route connecting the input switch ps(a) to all the output switches ps(z).

Method findRoutes(ps(a), current_route, array of routes found): find all the routes for a given ps(z). Results are in array of routes found
// Note: current_route contains also the switch already visited by this method
1. Get last visited switch: ps(last visited) from current_route
2. Get list of upstream photonic switches of ps(last visited)=>upstream_ps
3. For each switch ups(i) in upstream_ps
   3.1 If already visited, skip
   3.2 If us(i)=ps(a):
      3.2.1 Add ups(i) in current_route
      3.2.2 Add current_route into the array of routes found
      3.2.3 Remove last visited from current_route
4. For each switch ups(i) in upstream_ps:
   4.1 If already visited or ups(i)=ps(a), skip
   4.2 Add ups(i) into the current_route at last_visited position
   4.3 Call method findRoutes(ps(a), current_route, array of routes found)
   4.4 Remove last visited Path Determination In an embodiment, the objectives of a path finding process are to find one or more paths that Distribute the optical signal to the designated output ports with sufficient optical signal power required at each output port; Minimize the resource usage: optical links in general, amplifiers in particular; and Minimize signal to noise ratio. To achieve these objectives, the following heuristics have been developed for various embodiments in order to guide the path finding process: If the signal is to be distributed to multiple output ports, split the signal as close to the output ports as possible; Avoid using amplifiers if possible; If there's need to amplify the signal, amplify it as close to the input port as possible; As paths are created and put into operations, use actual measurements to gradually and accurately keep track of the signal power loss of the links the paths traverse through.

In an embodiment, the path determination process begins by accessing the stored route information gathered in the route determination process described above. Using this information and the information stored in network model data 372, a set of candidate paths are determined. The pseudo-code example below provides details on how the candidate paths are determined in an embodiment.

Candidate paths are generated based on several criteria, which may also be used for sorting the paths. Each factor may be assigned a weighted metric based on its importance, and the candidate paths may be ranked according to the combined metric assigned to the path element to be used for a candidate path. A path element using minimum resources is desirable for generating a candidate path.

The estimated signal power level at each output port should be calculated. If the output power levels meet the requirements, the candidate path will be added to the final array of candidate paths in an embodiment. If the output power levels do not meet the requirements, another distinct candidate path may be created using an alternate link (with an amplifier) closest to the input port. If the output power levels meet the requirements, this candidate path should be added to the final array of candidate paths found. If the output power levels do not meet the requirements, continue the process of creating alternative candidate paths continues. Other information may also be taken into consideration when generating paths. For example, the length of an optical link, time of day, or link popularity may affect the ranking of a path or path selection.

Paths, once selected, may be implemented on a network. In an embodiment, a selected path may be implemented on a virtual or simulated network. A simulated network environment may provide additional advanced details regarding the potential effects that a particular path implementation may have on the network or on individual network elements. This information can then be used to update network model data 372 in an embodiment.

Example Path Determination Pseudo-Code

The following represents an example pseudo-code listing for finding available paths, as discussed above:

//Following method finds paths using each of the routes found previously Method: findPaths(input port, input signal power, array of output ports, array of routes): returns an array of candidate paths
For each route:
1. Call method findPathsSingleRoute(input port, array of output ports, a route)
2. Add the candidate paths found into the final array of paths found
3. For each candidate path found:
   3.1 Create a distinct candidate path with a link with minimum resource at every candidate path element
   3.2 Calculate the estimated signal power level at each output port
   3.3 If the output power levels meet the requirements, add this candidate path to the final array of candidate paths found
   3.4 If the output power levels don't meet the requirements, create another distinct candidate path with an alternate link (with amplifier) closest to the input port
   3.5 If the output power levels meet the requirements, add this candidate path to the final array of candidate paths found
   3.6 If the output power levels don't meet the requirements, continue this process of creating alternative candidate path if possible
4. Sort the paths based on the least resource usage criteria
//Following method finds paths through a particular route found previously Method: findPathsSingleRoute(input port, array of output ports, route): returns an array of candidate paths
1. Structure the route based on how many hops from the input port to the output ports
2. Create an array of candidate path elements from the route
3. Populate each candidate path element with its corresponding "anchor" switch
4. Use the array of output ports to determine the initial output port count for each candidate path element:
   4.1 If no output port is located on the "anchor" switch of the candidate path element, the initial output port count is 0;
   4.2 Otherwise, the initial output out count is set to the number of output ports located on the corresponding "anchor" switch of this candidate path element.
5. Use structured route to loop through the array of candidate path elements from back to front. For each candidate path element:
   5.1 Call method findSharedLinksForCandidatePathElement(input port, route, candidate path element)
6. For each candidate path element:
   6.1 Call method findNonSharedLinksForCandidatePathElement(input port, route, candidate path element)

Method findSharedLinksForCandidatePathElement (input port, route, candidate path element)
1. Find shared links first that connect to 2 or more switches on the route
2. For each shared link found:
   2.1 Attach it to the corresponding candidate path element determined by the start port of the link
   2.2 Update the output port counts on the switches this link connects:
      2.2.1 For the switch on which the start port of the link is located, increase the output port by 1;
      2.2.2 For the switch(es) on which the end ports are located, decrease the output port count by as many end ports of the link landing on that switch;

Method findNonSharedLinksForCandidatePathElement (input port, route, candidate path element)
1. Initialize remaningOutputPortCount with the value of initialOutputPortCount
2. Iterate as long as (remainingOutputPortCount>0 and link_found_at_last_iteration=true):
   2.1 Find an available link with largest number of end ports that does not exceed the value of remainingOutputPortCount. If there are more than one link matches the criteria, choose one without amplifier if exist.
   2.2 If a link is found:
      2.2.1 Link_found_at_last_iteration=true;
      2.2.2 remainingOutputPortCount is decreased by the number of end ports of the link found
      2.2.3 Add this link to the corresponding candidate path element
      2.2.4 Find an alternate link of the same structure with amplifier if available
      2.2.5 Add this link to the candidate path element as well
   2.3 if no link found:
Declare failure Hardware Overview According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
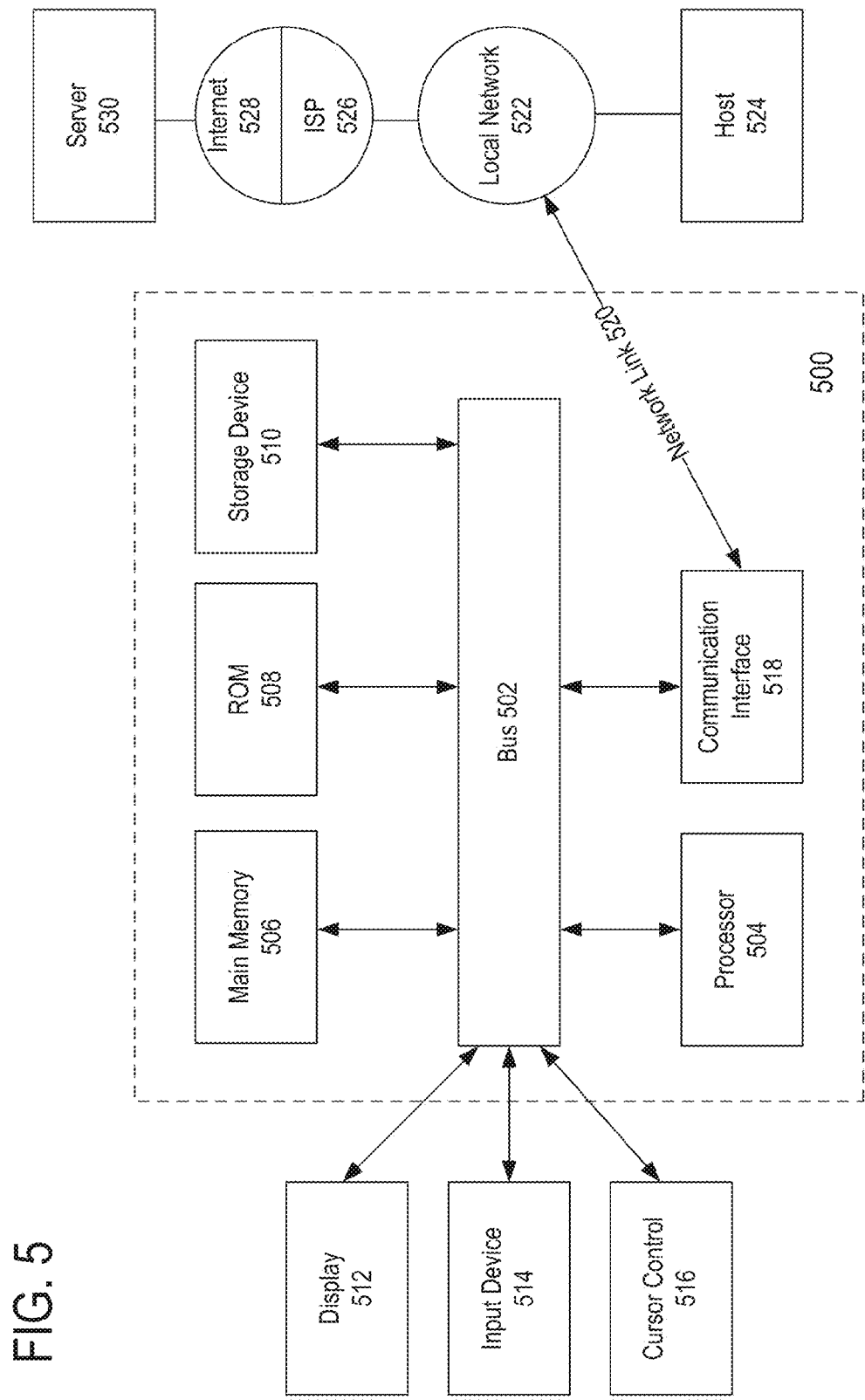
FIG. 5 is a block diagram that illustrates an example computing system on which an embodiment may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
maintaining a photonic network model, the network model being based on purely photonic elements that require no electrical-to-optical or optical-to-electrical conversion between a network input port for an optical beam and at least one network output port for said optical beam, wherein the photonic network model stores:
a) relationship information that describes the relationships between a plurality of network elements in the photonic network; and
b) configuration information that describes the current state of each of the plurality of network elements;
receiving a path generation request that includes a first port identifier and a second port identifier, wherein the first port identifier represents an input port and the second port identifier represents a first output port;
based at least in part on the relationship information and the configuration information, generating candidate paths that begin at the input port and end at at least the first output port; and
determining possible routes for the candidate paths for the optical beam;
wherein the method is performed by one or more computing devices, wherein the relationship information and configuration information are used for determining said possible routes by:
a) matching the network input port with a device in the known network topology information in network model data to determine input switch;
b) matching the network output ports provided as part of the initial request with one or more switches using network topology information stored in network model data to detect all candidate output switches;
c) comparing each said candidate output switch with the input switch to see if they are the same switch and if so, designating the said candidate output switch as one possible route;
d) otherwise, if the output switch is not also the input switch, examining switches that have an upstream relationship to the output switch; and for each upstream switch that has not been examined already, comparing such upstream switch with the input switch to see if they are the same switch, and if so, designating such switch and its downstream switch as a further possible route;
e) repeating steps c) and d) to recursive examine successive upstream switches to determine if they match the input switch; and
f) upon completion of step c) for all successive upstream switches and output switches, storing a list of possible routes so obtained in memory for use in selecting potential paths;
wherein the path generation request further comprises a third port identifier that represents a second output port, and the candidate paths begin at the input port and send at at least the first and second output ports.

2. The method of claim 1, further comprising:
generating a ranked list of the candidate paths based at least in part on power requirements associated with the first output port.

3. The method of claim 1, further comprising:
generating a ranked list of the candidate paths based at least in part on the resource usage of each candidate path.

4. The method of claim 1, further comprising:
generating a ranked list of the candidate paths based at least in part on the location of one or more photonic amplifiers in a candidate path.

5. The method of claim 1, further comprising:
generating a ranked list of the candidate paths based at least in part on the number of hops from the input port to the output port in a candidate path.

6. The method of claim 1, wherein generating the candidate paths from said possible routes comprises:
determining one or more potential photonic network routes, wherein each of the photonic network routes identifies one or more photonic switches that are capable of supporting a purely photonic path through the network; and
determining candidate paths from the one or more photonic network routes based at least in part on current configuration information that is stored in the network model.

7. The method of claim 5, wherein at least one of the candidate paths includes an optical loopback link.

8. The method of claim 1, further comprising:
generating a ranked list of the candidate paths;
based at least in part on the ranked list of the candidate paths, selecting a candidate path for configuration; and
automatically configuring a plurality of optical switches according to the requirements of the selected path.

9. The method of claim 1, further comprising:
generating a ranked list of the candidate paths; and
causing the ranked list of candidate paths to be displayed at a user interface of a client computing system.

10. The method of claim 1, further comprising:
generating the candidate paths based at least in part on the predicted optical signal to noise ratio in a potential candidate path.

11. The method of claim 1, further comprising:
generating the candidate paths based at least in part on one or more latency attributes associated with a potential candidate path.

12. The method of claim 1, further comprising:
generating the candidate paths based at least in part on the logical distance from a first splitter to the output port in a potential candidate path.

13. The method of claim 1, further comprising:
establishing candidate paths for a photonic information-carrying signal by:
g) optically splitting the photonic signal adjacent to closest output ports into multiple beams without alteration if the photonic signal is to be distributed to multiple output ports;
h) selecting routes for the paths that minimize use of photonic amplifiers;
i) amplifying the photonic signal adjacent to the input port if optical amplification is needed; and
i) using actual measurements on active optical paths to gradually and accurately track signal power loss of links through which the paths traverse to minimize signal to noise ratio.

14. The method of claim 13 further comprising:
j) accessing the stored route information gathered in the route determination steps a)-f);

k) determining a set of candidate paths using the stored route information and information stored in network model data;
l) calculating estimated signal power level at each output port;
m) if output power levels at each output port meet requirements, adding the candidate path to a final array of candidate paths; and
n) if the output power levels do not meet the requirements, creating a further distinct candidate path using an alternate link closest to the input port;
o) if the output power levels of the further distinct candidate path meet the requirements, adding the further distinct candidate path to the final array of candidate paths;
p) repeating steps n) through p) until all further alternative candidate paths have been evaluated;
q) upon selection of the paths, implementing the paths on an optical network;
in order to distribute the optical signal to the designated output ports with sufficient optical signal power required at each output port to minimize resource usage of optical links and optical amplifiers, and to minimize signal to noise ratio.

15. The method of claim 14, further comprising:
r) assigning a weighted metric to each path element in each candidate path, with higher ranking being assigned for candidate path elements employing least resources;
s) generating a ranked list the candidate paths according to a combined metric of each candidate path; and
t) selecting as preferred path the candidate path having highest metric.

16. The method of claim 14, wherein the generating of a ranked list of the candidate paths is based at least in part on at least one of the following:
power requirements associated with the first output port;
minimum length of an optical link;
time of day;
minimum resource usage of a candidate path;
furthest location of a photonic amplifier along a candidate path;
minimum number of hops along the candidate path;
maximum predicted optical signal to noise ratio;
minimum latency;
maximum logical distance from a first splitter to the output port; and
link popularity.

17. A system comprising:
at least one digital computing device for storing instructions which, when executed by one or more processors, cause the instructions to perform:
maintaining a photonic network model, the network model being based on purely photonic elements that require no electrical-to-optical or optical-to-electrical conversion between a network input port for an optical beam and at least one network output port for said optical beam, wherein the photonic network model stores:
a) relationship information that describes the relationships between a plurality of network elements in the photonic network; and
b) configuration information that describes the current state of each of the plurality of network elements;
receiving a path generation request that includes a first port identifier and a second port identifier, wherein the first port identifier represents an input port and the second port identifier represents a first output port;
based at least in part on the relationship information and the configuration information, generating candidate paths that begin at the input port and end at at least the first output port; and
determining possible routes for the candidate paths for the optical beam, wherein the relationship information and configuration information are used for determining said possible routes by:
a) matching the network input port with a device in the known network topology information in network model data to determine input switch;
b) matching the network output ports provided as part of the initial request with one or more switches using network topology information stored in network model data to detect all candidate output switches;
c) comparing each said candidate output switch with the input switch to see if they are the same switch and if so, designating the said candidate output switch as one possible route;
d) otherwise, if the output switch is not also the input switch, examining switches that have an upstream relationship to the output switch; and for each upstream switch that has not been examined already, comparing such upstream switch with the input switch to see if they are the same switch, and if so, designating such switch and its downstream switch as a further possible route;
e) repeating steps c) and d) to recursive examine successive upstream switches to determine if they match the input switch; and
f) upon completion of step c) for all successive upstream switches and output switches, storing a list of possible routes so obtained in memory for use in selecting potential paths;
wherein the path generation request further comprises:
a third port identifier that represents a second output port, and the candidate paths begin at the input port and send at at least the first and second output ports.

18. The system of claim 17, further comprising instructions for:
generating a ranked list of the candidate paths based at least in part on power requirements associated with the first output port.

19. The system of claim 17, further comprising instructions for:
generating a ranked list of the candidate paths based at least in part on the resource usage of each candidate path.

20. The system of claim 17, further comprising instructions for:
generating a ranked list of the candidate paths based at least in part on the location of one or more amplifiers in a candidate path.

21. The system of claim 17, further comprising instructions for:
generating a ranked list of the candidate paths based at least in part on the number of hops from the input port to the output port in a candidate path.

22. The system of claim 17, wherein generating the candidate paths from said possible routes comprises:
determining one or more potential photonic network routes, wherein each of the photonic network routes identifies one or more photonic switches that are capable of supporting a purely photonic path through the network; and
determining candidate paths from the one or more photonic network routes based at least in part on current configuration information that is stored in the network model.

23. The system of claim 21, wherein at least one of the candidate paths includes an optical loopback link.

24. The system of claim 17, further comprising instructions for:
generating a ranked list of the candidate paths;
based at least in part on the ranked list of the candidate paths, selecting a candidate path for configuration; and
automatically configuring a plurality of optical switches according to the requirements of the selected path.

25. The system of claim 17, further comprising instructions for:
generating a ranked list of the candidate paths; and
causing the ranked list of candidate paths to be displayed at a user interface of a client computing system.

26. The system of claim 17, further comprising instructions for:
generating the candidate paths based at least in part on the predicted optical signal to noise ratio in a potential candidate path.

27. The system of claim 17, further comprising instructions for:
generating the candidate paths based at least in part on one or more latency attributes associated with a potential candidate path.

28. The system of claim 17, further comprising instructions for:
generating the candidate paths based at least in part on the logical distance from a first splitter to the output port in a potential candidate path.

29. The system of claim 17 further comprising instructions for:
establishing candidate paths for a photonic information-carrying signal by:
g) optically splitting the photonic signal adjacent to closest output ports into multiple beams without alteration if the photonic signal is to be distributed to multiple output ports;
h) selecting routes for the paths that minimize use of photonic amplifiers;
i) amplifying the photonic signal adjacent to the input port if optical amplification is needed; and
j) using actual measurements on active optical paths to gradually and accurately track signal power loss of links through which the paths traverse to minimize signal to noise ratio;
k) updating the optical network model to reflect the detected change in response to detecting an inconsistency between a detected attribute of the network and an attribute of the network stored in the optical network model; and
l) using the changed information to generate the candidate paths.

30. A system for controlling a purely photonic network comprising:
at least one digital computing device configured for:
storing instructions which, when executed by one or more processors, cause the instructions to control a photonic network, the photonic network comprising purely photonic elements that require no electrical-to-optical or optical-to-electrical conversion between a network input port and a network output port, wherein the digital computing device stores:
a) relationship information that describes the relationships between a plurality of network elements in the photonic network; and
b) configuration information that describes the current state of each of the plurality of network elements;
receiving a path generation request that includes a first port identifier and a second port identifier, wherein the first port identifier represents an input port and the second bort identifier represents a first output port;
based at least in part on the relationship information and the configuration information, generating candidate paths that begin at the input port and end at least at the first output port, wherein the relationship information and configuration information are used for determining said possible routes by:
a) matching the network input port with a device in the known network topology information in network model data to determine input switch;
b) matching the network output ports provided as part of the initial request with one or more switches using network topology information stored in network model data to detect all candidate output switches;
c) comparing each said candidate output switch with the input switch to see if they are the same switch and if so, designating the said candidate output switch as one possible route;
d) otherwise, if the output switch is not also the input switch, examining switches that have an upstream relationship to the output switch; and for each upstream switch that has not been examined already, comparing such upstream switch with the input switch to see if they are the same switch, and if so, designating such switch and its downstream switch as a further possible route;
e) repeating steps c) and d) to recursive examine successive upstream switches to determine if they match the input switch; and
f) upon completion of step c) for all successive upstream switches and output switches, storing a list of possible routes so obtained in memory for use in selecting potential paths;
wherein the path generation request further comprises:
a third port identifier that represents a second output port, and the candidate paths begin at the input port and send at at least the first and second output ports.

31. The system of claim 30, further comprising instructions for:
generating a ranked list of the candidate paths based at least in part on power requirements associated with the first output port.

32. The system of claim 30, further comprising instructions for:
generating a ranked list of the candidate paths based at least in part on the resource usage of each candidate path.

33. The system of claim 30, further comprising instructions for:
generating a ranked list of the candidate paths based at least in part on the location of one or more amplifiers in a candidate path.

34. The system of claim 30, further comprising instructions for:
generating a ranked list of the candidate paths based at least in part on the number of hops from the input port to the output port in a candidate path.

35. The system of claim 34, wherein generating the candidate paths from said possible routes comprises:
determining one or more potential photonic network routes, wherein each of the photonic network routes identifies one or more photonic switches that are capable of supporting a purely photonic path through the network;
determining candidate paths from the one or more photonic network routes based at least in part on current configuration information that is stored in the network model; and determining possible routes for the candidate paths for the optical beam.

36. The system of claim 34, wherein at least one of the candidate paths includes an optical loopback link.

37. The system of claim 30, further comprising instructions for:
   generating a ranked list of the candidate paths;
   based at least in part on the ranked list of the candidate paths, selecting a candidate path for configuration; and
   automatically configuring a plurality of optical switches according to the requirements of the selected path.

38. The system of claim 30, further comprising instructions for:
   generating a ranked list of the candidate paths; and
   causing the ranked list of candidate paths to be displayed at a user interface of a client computing system.

39. The system of claim 30, further comprising instructions for:
   generating the candidate paths based at least in part on the predicted optical signal to noise ratio in a potential candidate path.

40. The system of claim 30, further comprising instructions for:
   generating the candidate paths based at least in part on one or more latency attributes associated with a potential candidate path.

41. The system of claim 30, further comprising instructions for:
   generating the candidate paths based at least in part on the logical distance from a first splitter to the output port in a potential candidate path.

42. The system of claim 30, further comprising instructions for:
   establishing candidate paths for a photonic information-carrying signal by:
   g) optically splitting the photonic signal adjacent to closest output ports into multiple beams without alteration if the photonic signal is to be distributed to multiple output ports;
   h) selecting routes for the paths that minimize use of photonic amplifiers;
   i) amplifying the photonic signal adjacent to the input port if optical amplification is needed; and
   j) using actual measurements on active optical paths to gradually and accurately track signal power loss of links through which the paths traverse to minimize signal to noise ratio.

* * * * *